United States Patent [19]

Harwood et al.

[11] 4,385,311

[45] May 24, 1983

[54] FILTER AND PHASE SHIFT CIRCUIT FOR A TELEVISION AUTOMATIC FLESH COLOR CORRECTION SYSTEM

[75] Inventors: Leopold A. Harwood, Bridgewater; Erwin J. Wittmann, North Plainfield, both of N.J.

[73] Assignee: RCA Corporation, New York, N.Y.

[21] Appl. No.: 249,947

[22] Filed: Apr. 1, 1981

[51] Int. Cl.³ .......................................... H04N 9/535
[52] U.S. Cl. ...................................................... 358/28
[58] Field of Search .................................... 358/28, 19

[56] References Cited

U.S. PATENT DOCUMENTS

| | | | |
|---|---|---|---|
| 3,749,825 | 7/1973 | Moore | 358/28 |
| 3,996,608 | 12/1976 | Harwood | 358/28 |
| 4,020,500 | 4/1977 | Harwood | 358/19 |
| 4,051,519 | 9/1977 | Harwood | 358/28 |
| 4,084,178 | 4/1978 | Srivastava et al. | 358/28 |
| 4,207,590 | 6/1980 | Naimpally et al. | 358/28 |

Primary Examiner—Tommy P. Chin
Attorney, Agent, or Firm—Eugene M. Whitacre; Paul J. Rasmussen; Ronald H. Kurdyla

[57] ABSTRACT

A frequency selective signal translating circuit is disclosed for use in a color television receiver including an automatic flesh tone color correction network which provides a reference signal for color demodulators of the receiver. The circuit comprises an input bandpass filter for attenuating unwanted frequency components from the reference signal output of the correction network. The filter is followed by a phase shifter for shifting the phase of the filtered reference signal as required for proper demodulator operation. The filter comprises a fixed alignment, single-tuned, series resonant circuit coupled in series between the correction network output and the demodulator reference signal inputs.

15 Claims, 9 Drawing Figures

FILTER AND PHASE SHIFT CIRCUIT FOR A TELEVISION AUTOMATIC FLESH COLOR CORRECTION SYSTEM

This invention concerns a frequency selective circuit employed in conjunction with a color television receiver system which automatically corrects errors in the flesh tone of a reproduced color picture. In particular, the circuit filters an output reference signal from the correction network to attenuate unwanted frequency components, and supplies filtered reference signals to color demodulators of the receiver with proper timing and an appropriate amplitude and phase versus frequency response.

It is known that, in the process of reproducing images from received color television signals, for example, the phase relationship between the transmitted color reference carrier and the color image-representative (chrominance) signals may vary due to a variety of factors such as atmospheric conditions and switching channels at the receiver. The variations cause errors in the hue of a reproduced color image, and are particularly noticeable by a viewer when the color image includes flesh tones (i.e., tones represented by signals in the orange or "+I" phase region).

A number of systems have been utilized to provide automatic flesh tone correction in color television receivers. One such system is described in U.S. Pat. No. 3,996,608 of L. A. Harwood. In that system, a dynamic flesh control network provides a continuous wave output reference signal having a phase modified towards the phase of chrominance signals sensed as having a phase with a nominal range of flesh tone phase. The reference signal is afterwards phase shifted to provide mutually quadrature phase reference signals, which are applied to "I" and "Q" color phase demodulators in the receiver for deriving R-Y, G-Y and B-Y color difference signals in a known manner.

In dynamic control systems of this type, the reference signal from the flesh control network often contains unwanted signal components such as harmonics of the 3.58 MHz. chrominance subcarrier frequency, and a D.C. component which varies at a relatively low frequency rate. Proper demodulation of the chrominance signals applied to the I and Q demodulators requires that these unwanted components be attenuated. Another requirement for proper demodulator operation is that the reference signals applied to the I and Q demodulators exhibit proper timing relative to the chrominance signal and an appropriate mutual phase difference.

These requirements are satisfied by a frequency selective signal translating network according to the present invention. The circuit is uncomplicated, inexpensive, and does not require precision tolerance components. In addition, the circuit does not require alignment from one receiver to another, thereby facilitating receiver manufacture.

Apparatus according to the present invention is included in a system for processing a color television signal including chrominance signals having a phase representative of image hue and a reference subcarrier component having a nominal phase relative to the chrominance signal. The system includes a chrominance signal demodulator with a chrominance signal input and a reference signal input, a phase control network, and a filter network. Proper operation of the demodulator requires that the chrominance and reference signal inputs to the demodulator exhibit appropriate timing synchronism, and that the input reference signals exhibit a frequency substantially equal to the frequency of the subcarrier component substantially exclusive of high frequency components including harmonics of the subcarrier frequency. The phase control network responds to the chrominance signal and to a signal derived from the subcarrier component. The phase control network provides an output phase controlled reference signal at the frequency of the subcarrier component and with a phase modified toward the phase of the chrominance signal when the chrominance signal phase is within a range of phases corresponding to a nominal range of flesh tone phase. The reference signal also undesirably comprises high frequency components including harmonic frequencies of the subcarrier frequency. The filter network supplies the reference signal to the demodulator reference signal input via a reference signal coupling path. The filter network consists of a single-tuned, series resonant bandpass filter coupled in series in the reference signal path, and is tuned to attenuate the undesired high frequency components including harmonics in the reference signal as applied to the demodulator.

In accordance with a feature of the invention, the bandpass filter comprises a reactive circuit consisting of a series coupled inductor and capacitor.

In accordance with another feature of the invention, the bandpass filter imparts a given phase shift to the reference signals such that filtered reference signals exhibit timing synchronism with the chrominance signals at the demodulator inputs.

In accordance with a further feature of the invention, the bandpass filter is tuned to exhibit a peak amplitude response at the frequency of the subcarrier component, and filtered reference signals are applied to the demodulator via a capacitor which imparts a given phase shift to the filtered reference signals such that the filtered reference signals exhibit timing synchronism with the chrominance signals at the demodulator inputs.

Figure 1:
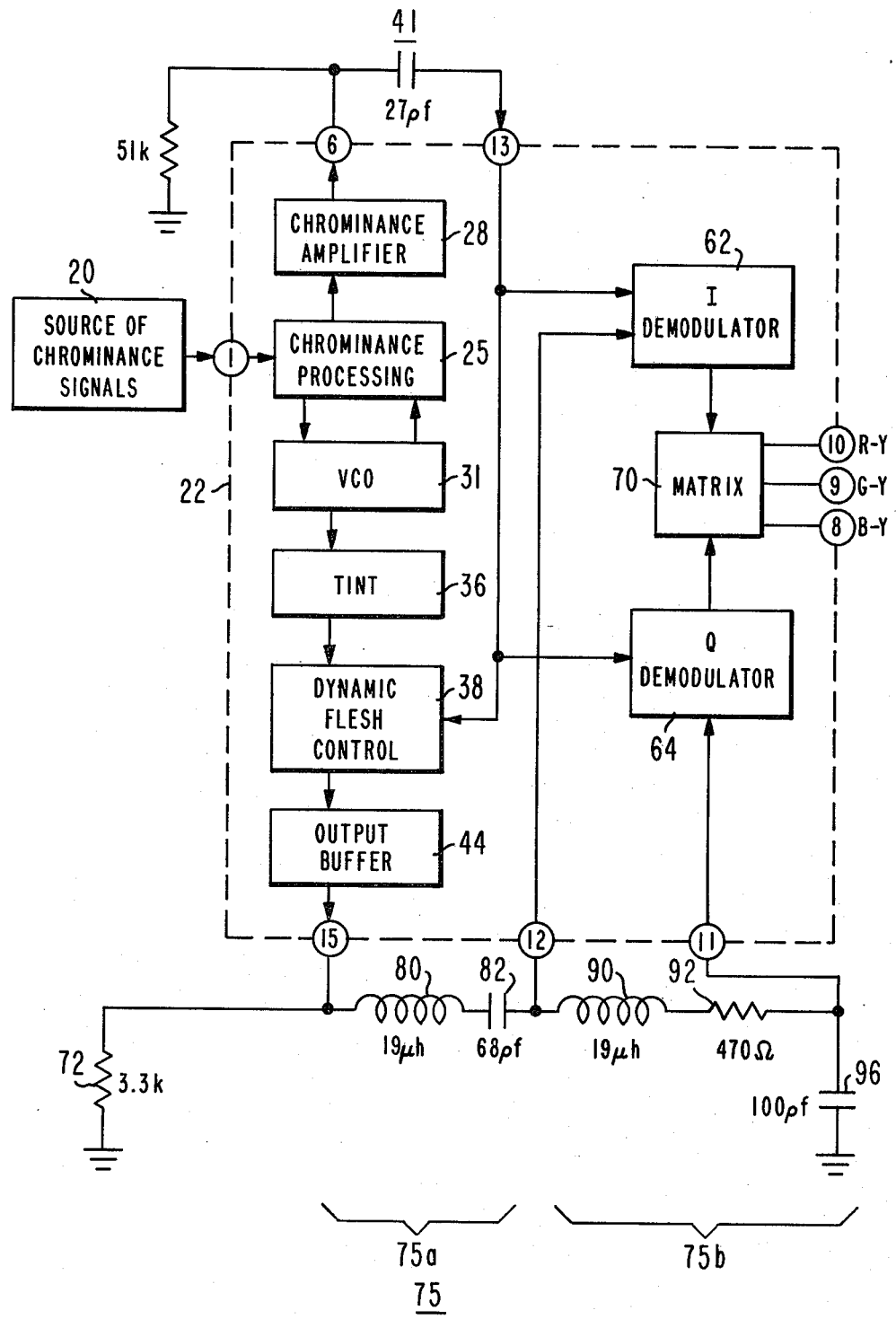
FIG. 1 illustrates partly in block diagram form and partly in schematic circuit diagram form, a portion of a color television including an automatic flesh tone control circuit and an associated signal translating circuit according to the present invention.

In FIG. 1, a source of chrominance signals 20 derived from a received color television signal supplies chrominance signals to an external input terminal 1 of a signal processing integrated circuit 22. In this example, the integrated circuit corresponds to integrated circuit type CA 3151 available from RCA Corporation, Solid State Division, Somerville, N.J. The chrominance signals are further processed in a chrominance processing unit 25, which in this example includes amplification stages, sampling networks, automatic color control (ACC) and automatic frequency and phase control (AFPC) detectors, and associated circuits.

Output signals from processor 25 are supplied to a voltage controlled color reference oscillator (VCO) 31 (e.g., of the type described in U.S. Pat. No. 4,020,500), which is arranged to regenerate a continuous wave output reference signal from the burst reference component which is customarily provided in a broadcast color television signal. An output signal of VCO 31 is supplied as an input to sampling and detecting circuits within unit 25, which monitor the phase and frequency of the oscillator signal and provide appropriate control signals for locking the oscillator signal in phase and frequency to the burst component.

Another output of VCO 31 is applied to a tint (hue) control unit 36 (e.g., of the type shown in U.S. Pat. No. 4,051,512) which may be adjusted either electronically or manually, for example, by means of a potentiometer to shift the phase of the oscillator reference signal and thereby produce a change in hue of a reproduced image. A reference signal output of tint control unit 36 is coupled to one input of a dynamic flesh control unit 38, another input of which is supplied with amplified chrominance signals which are coupled from an output of a chrominance amplifier 28 via a terminal 6, an A.C. coupling network 41, and a terminal 13.

Figure 2:
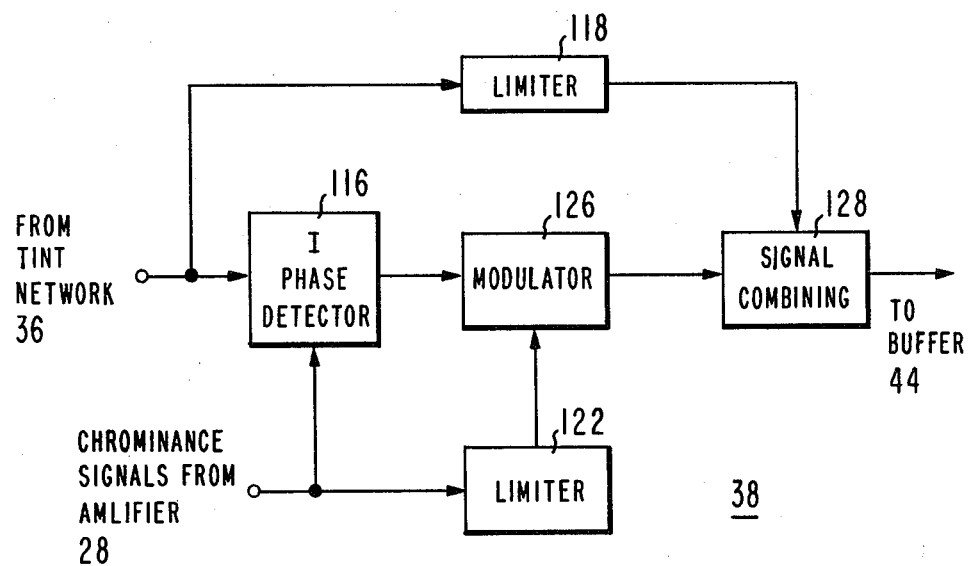
FIG. 2 shows a block diagram of the automatic flesh tone control circuit of FIG. 1.

The essential elements of flesh control unit 38 are shown in FIG. 2. In FIG. 2, chrominance signals from amplifier 28 are supplied to one input of an I axis phase detector 116, and to a chrominance signal limiting amplifier 122. Another input of phase detector 116 is supplied with reference carrier output signals from tint network 36. The limited chrominance signal output of limiter 122 is supplied to one input of a signal modulator 126. The output of phase detector 116, which is the product of the applied chrominance and reference carrier signals, is applied to a second input of modulator 126 to selectively vary the amplitude of the amplitude limited chrominance signal which is applied to an input of a signal combining network 128. An amplitude limited carrier reference signal from an output of a signal limiter 118 is coupled to an input of combining network 128, where it is vectorially combined with selected portions of the amplitude limited chrominance signal from modulator 126. A resultant phase corrected carrier reference signal from the output of combining network 128 is coupled to a buffer 44 (FIG. 1).

Flesh control network 38 operates on the premise that the operating parameters of tint control network 36 (FIG. 1) are adjusted (e.g., by means of a viewer adjustable potentiometer, not shown) at some point in time to reasonably produce flesh tones. Phase detector 116, which is arranged to detect characteristics of the chrominance signal along the same phase axis at that along which "I" demodulator 62 operates, will then be aligned to detect the presence of flesh tone chrominance signals. In that case, detector 116 multiplies the applied chrominance and subcarrier signals to provide a maximum output when the applied chrominance signal phase is coincident with the I phase axis, and a decreasing output is provided as the chrominance signal phase departs from the I axis. Thus, when the chrominance signals are in the vicinity of flesh tones, phase detector 116 controls the transfer characteristic of modulator 126 to pass more or less of the amplitude limited chrominance signal output of limiter 122 according to the phase displacement between the I reference phase carrier and the chrominance signals. The resulting controlled portion of the amplitude limited chrominance signal combines with the limited reference subcarrier signal in combining network 128 to produce a new reference carrier, the phase of which is shifted towards that of the chrominance signal. Additional details concerning the operation of flesh correction circuit 38 are disclosed in U.S. Pat. No. 3,996,608 of L. A. Harwood.

Continuing with FIG. 1, the output reference signal from flesh correction circuit 38 is coupled at a low impedance via buffer 44. Buffer 44 comprises an emitter follower transistor which supplies signals from network 38 to an external terminal 15 of the integrated circuit via the low impedance emitter output of the buffer transistor. A resistor 72 coupled to terminal 15 comprises an emitter load impedance for the buffer transistor. The reference signal at terminal 15 is translated by a frequency selective network 75 which is coupled to external terminals 15, 12 and 11 before the reference signal is applied as a reference input signal to "I" demodulator 62 and "Q" demodulator 64, which also receive input chrominance signals to be demodulated from amplifier 28 via terminal 13.

Demodulated chrominance signals from the respective outputs of demodulators 62, 64 are supplied to a matrix 70, where the demodulated signals are combined to provide R-Y, G-Y and B-Y color difference signals. The color difference signals appear at terminals 8, 9 and 10, and are afterwards further processed and combined with the luminance component of the television signal to produce R, G, and B color image representative signals which are supplied to a color kinescope of the receiver (not shown). All of the signal processing functions shown in the arrangement of FIG. 1, with the exception of networks 41 and 75, are included on integrated circuit 22.

It is noted that the reference signal output from flesh control network 38 at terminal 15 exhibits a phase delay relative to the chrominance signal that is applied to demodulators 62 and 64 from amplifier 28. This phase delay is on the order of twenty-five degrees and is attributable to signal processing delays such as may be caused by parasitic capacitances within network 38. Network 75 is arranged to compensate for this delay as will be discussed.

It is also noted that the reference signal developed at terminal 15 is in the form of pulses of varying widths and amplitudes in accordance with the switching control action of network 38. It is necessary to restore the reference signal to substantially sinusoidal form at the 3.58 MHz. subcarrier frequency before the reference signal is applied to the color demodulators. Thus is it necessary to attenuate high frequency switching components, including harmonics of the 3.58 MHz. subcarrier frequency, in the signal developed at terminal 15, so that switching operation of the circuits in the color demodulators will be properly timed. It is also desirable to suppress low frequency variations (e.g., below 500 KHz.) of the DC level of the reference signal at terminal 15. These variations are typically associated with large picture area chrominance signal variations. These requirements are satisfied by network 75 coupled between terminal 15 and terminals 12 and 11.

Network 75 comprises an input bandpass filter network 75a followed by a quadrature (ninety degree) phase shift network 75b.

Filter 75a comprises a single-tuned, fixed alignment, series resonant LC reactive network including an inductor 80 and a capacitor 82 arranged in series in the signal path between terminals 15 and 12. Capacitor 82 also provides DC isolation between terminal 15 and terminals 12, 11. Filter 75a as arranged in circuit 75 exhibits a "Q" of approximately three, and is tuned to approximately 4 MHz., or above the 3.58 MHz. subcarrier frequency. Tuning of filter 75a above the 3.58 MHz. fundamental frequency of the referencing signals serves to impart a phase advance of approximately twenty-five degrees to signals developed at terminal 12 relative to signals supplied from terminal 15. This phase advance compensates for signal processing delays caused by parasitic capacitances within network 38 as noted previously, and assures that proper timing synchronism exists between the chrominance signals and the reference signals that are applied to the color demodulators.

The filtering action of filter 75a also attenuates the undesirable high frequency (harmonic) components attributable to the switching action of control network 38, as well as low frequency variations noted previously. The filtered signals from filter 75a are substantially sinusoidal in form and are coupled to the reference signal input of I demodulator 62 via terminal 12.

Quadrature phase shift network 75b phase shifts signals from network 75a by approximately ninety degrees, so that signals developed at terminals 11 and 12 exhibit an appropriate mutual phase relationship, suitable for application to demodulators 62 and 64. Network 75b is tuned to 3.58 MHz. and exhibits a "Q" of approximately unity, and comprises a series resonant circuit including an inductor 90, a resistor 92, and a capacitor 96 arranged as shown, together with parasitic capacitances associated with terminals 11 and 12.

Figure 3A:
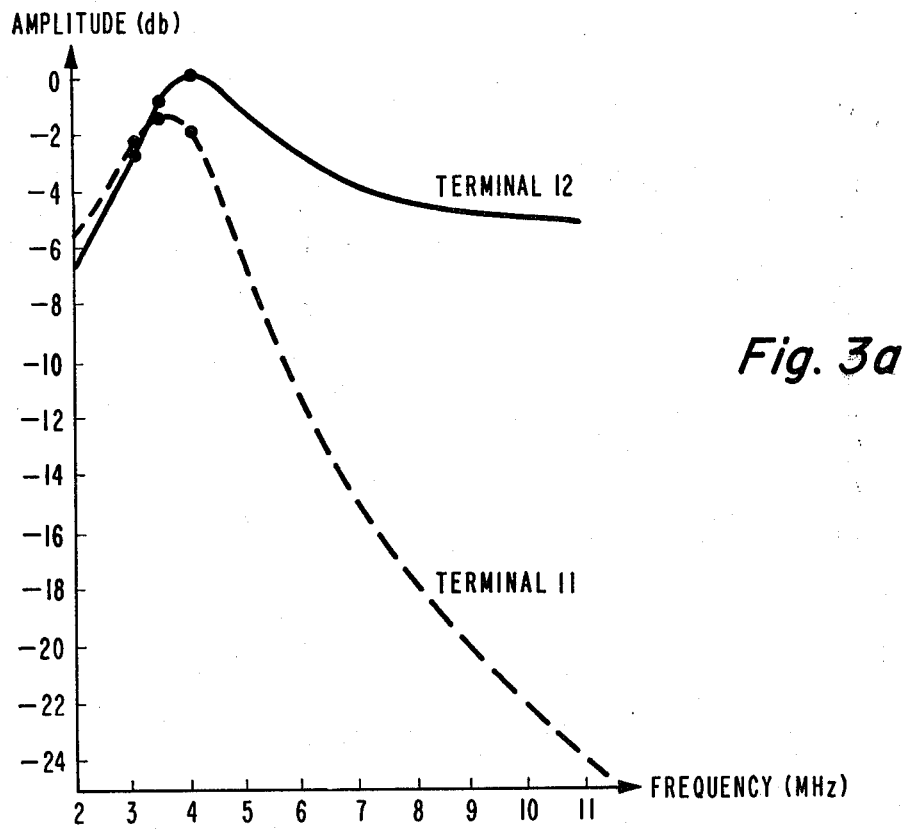
FIGS. 3a, 3b and 4a, 4b illustrate frequency response characteristics of the signal translating circuit shown in FIG. 1.
Figure 3B:
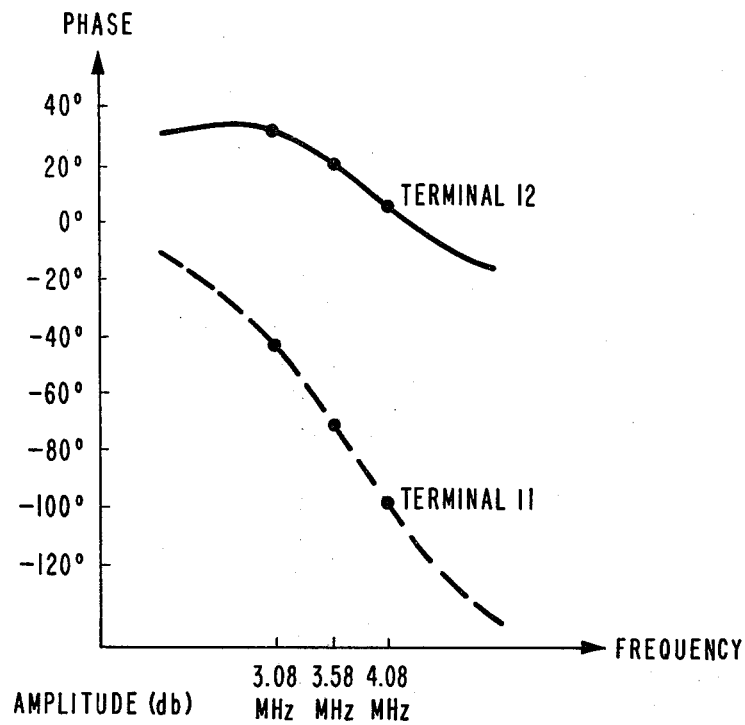

The amplitude versus frequency transfer function of network 75 for signals developed at terminals 11 and 12 is shown in FIG. 3a. The phase versus frequency transfer function of network 75 for signals developed at these terminals is shown in FIG. 3b. As seen from FIG. 3a, the amplitude response at 3.08 MHz. and 4.08 MHz. with reference to 3.58 MHz. is approximately −2.0 db and +0.6 db at terminal 12, and approximately −1.0 db and −0.5 db at terminal 11. As seen from FIG. 3b, the phase difference between terminals 11 and 12 is approximately 90° at 3.58 MHz., 75° at 3.08 MHz., and 100° at 4.08 MHz.

These amplitude and phase responses are appropriate with respect to the input signal amplitude and phase requirements of color demodulators 62 and 64. It is noted that the amplitude versus frequency response shown in FIG. 3a desirably does not exhibit a peak amplitude response in the vicinity of the second harmonic (7.2 MHz.) or the third harmonic (10.7 MHz.) of the 3.58 MHz. chrominance subcarrier frequency. If such peaks did exist, a slight de-tuning of network 75 (e.g., due to component tolerance effects) could result in less attenuation of reference signal harmonics at these frequencies. These observations also pertain to the amplitude and phase versus frequency responses which will be discussed subsequently.

Figure 4A:
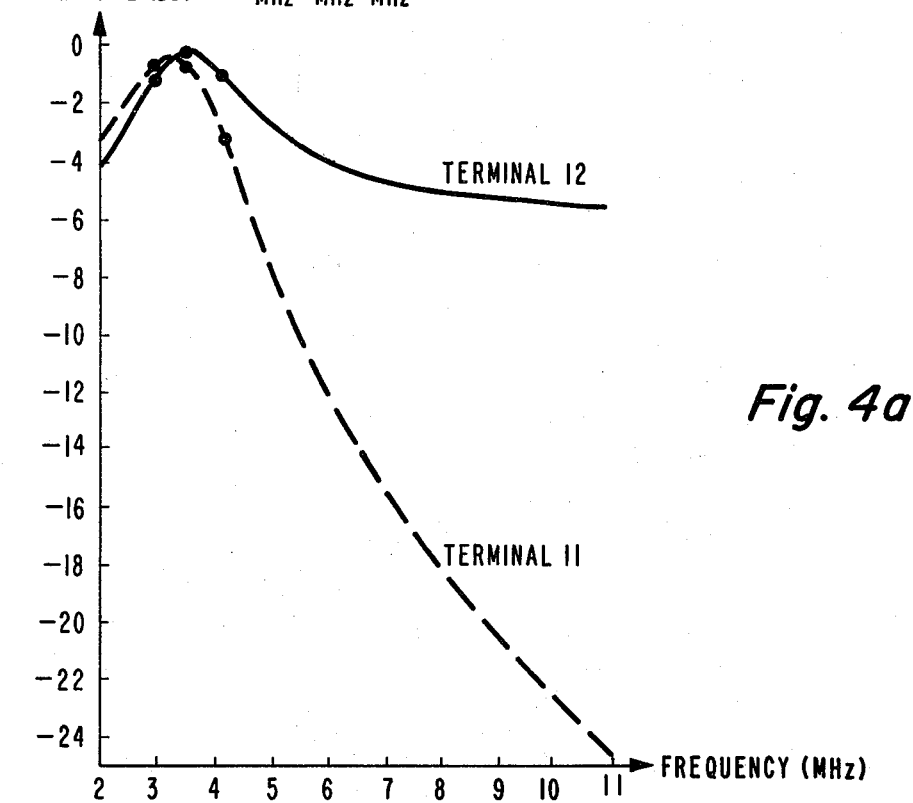
Figure 4B:
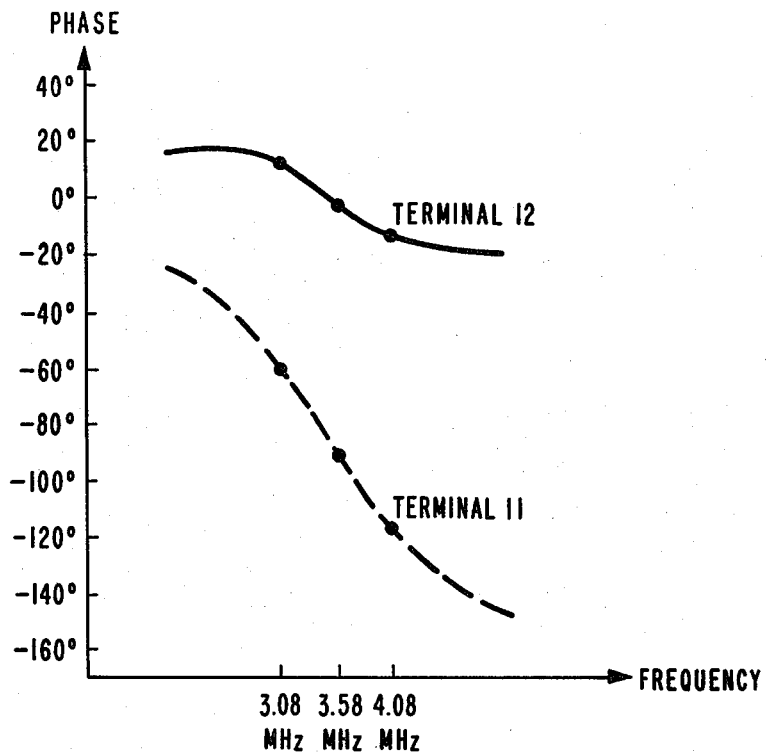

The phase advance provided by filter 75a is not required in all cases, such as when phase compensation is provided elsewhere in the system, or when phase delays requiring compensation do not exist or are negligibly small. In these cases filter 75a can be tuned to the 3.58 MHz. subcarrier frequency, such as by suitably increasing the value of capacitor 82. With this modification network 75 will exhibit amplitude and phase versus frequency responses as shown in FIGS. 4a and 4b respectively. The amplitude response at 3.08 MHz. and 4.08 MHz. with reference to 3.58 MHz. is approximately −0.5 db and −0.6 db at terminal 12, and approximately +0.2 db and −2.0 db at terminal 11. The phase difference between terminals 11 and 12 is approximately 90° at 3.58 MHz., 75° at 3.08 MHz., and 100° at 4.08 MHz.

Figure 5:
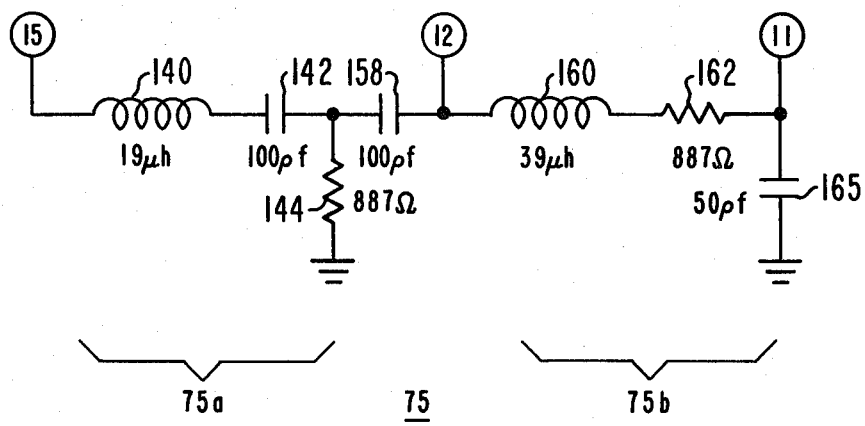
FIG. 5 shows an alternative version of the signal translating circuit shown in FIG. 1.

FIG. 5 shows an alternative version of network 75. As in the case of FIG. 1, in FIG. 5 network 75 comprises an input bandpass filter 75a followed by a quadrature phase shift network 75b. An AC coupling phase shift capacitor 158 is coupled between networks 75a and 75b. Capacitor 158 provides the phase advance necessary to compensate for the signal processing delays of control network 38.

Filter 75a is tuned to the 3.58 MHz. subcarrier frequency, and comprises a single-tuned, fixed alignment, series resonant LC reactive network including an inductor 140 and a capacitor 142 arranged in series in the signal path between terminal 15 and terminal 12. An output terminating resistor 144 is coupled between the output of filter 75a and ground reference potential. Filter 75a as arranged in circuit 75 exhibits a "Q" of approximately three, and exhibits substantially zero phase shift at 3.58 MHz. The high and low frequency components mentioned previously are attenuated in the output signal from filter 75a as applied to capacitor 158.

Figure 6A:
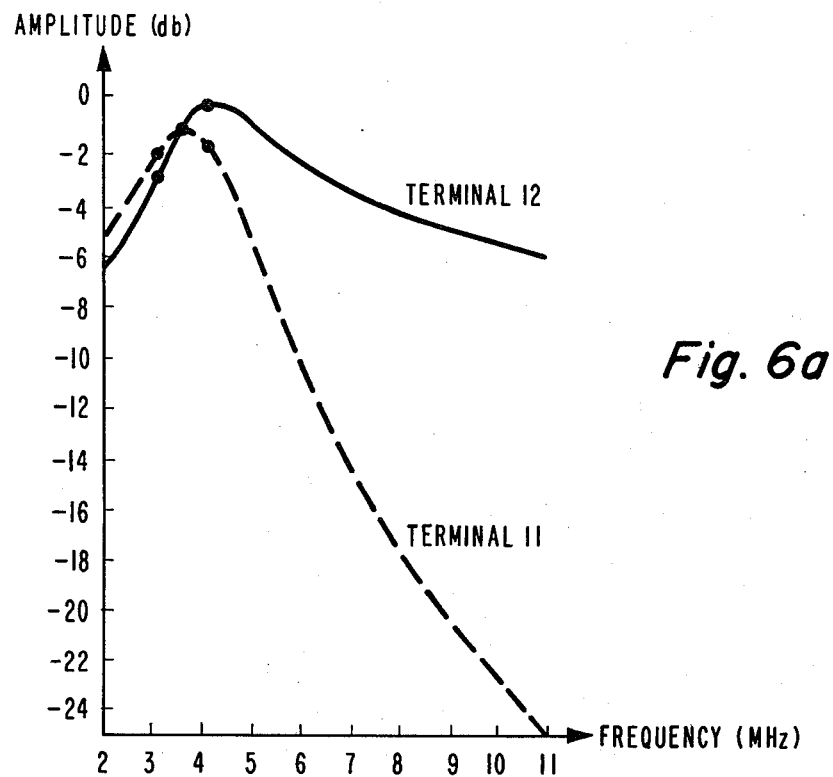
FIGS. 6a, 6b depict frequency response characteristics of the signal translating circuit shown in FIG. 5.
Figure 6B:
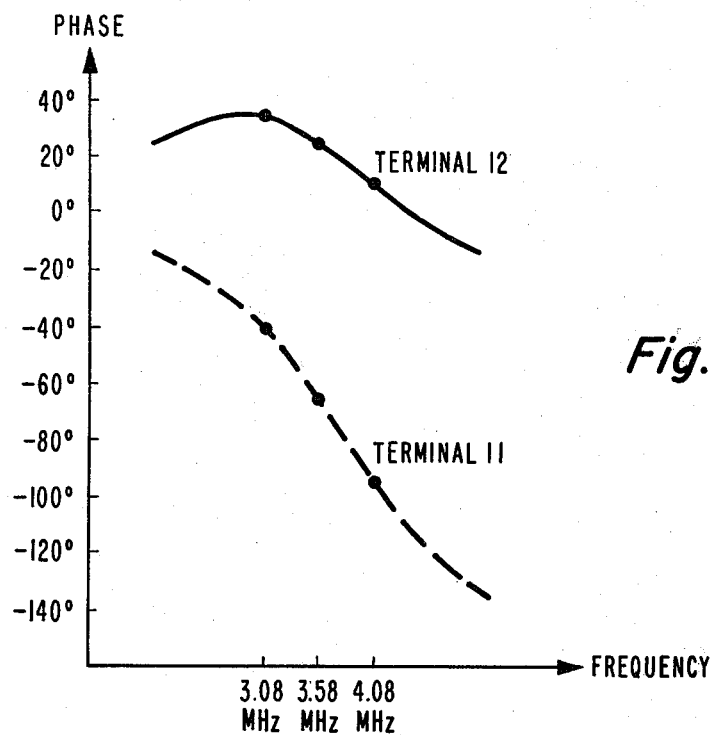

Quadrature phase shift network 75b includes an inductor 160, resistor 162 and capacitor 165 arranged as shown, and corresponds in structure and function to phase shift network 75b of FIG. 1. The amplitude and phase versus frequency responses of network 75 in FIG. 5 are shown in FIGS. 6a and 6b, respectively, and are generally similar to the amplitude and phase responses shown in FIGS. 3a and 3b for network 75 in FIG. 1.

Both versions of network 75, as shown in FIGS. 1 and 5, exhibit predictable operation and do not require relatively large and costly elements, such as adjustable, highly temperature stabilized, or high precision elements. Time consuming alignment from one receiver to another is unnecessary, thereby facilitating automated circuit assembly and testing during receiver manufacture.

With regard to network 75 in FIG. 5, it is noted that the amplitude and phase versus frequency response of input filter 75a is substantially unaffected by the operating characteristics of phase shift network 75b. Both networks 75a and 75b are resonant at the 3.58 MHz. chrominance subcarrier frequency, and at resonance the impedance of network 75b is resistive. Therefore, the input impedance of network 75b, as seen from the output of filter 75a (across resistor 144), resembles a non-reactive, resistive impedance. Consequently, at resonance phase shift network 75b exhibits substantially no interaction with filter 75a, and therefore does not upset the phase response of filter 75a. Interaction of phase shift network 75b with filter 75a is minimum even in the presence of capacitor 158, which imparts a small phase advance as discussed. Phase advance provided by means of capacitor 158 is not required in all cases, however, as noted previously.

What is claimed is:

1. In a system for processing a color television signal including chrominance signals having a phase representative of image hue and a reference subcarrier component having a nominal phase relative to said chrominance signal, said system including chrominance signal demodulator means with an input for receiving said chrominance signal and a reference signal input, wherein proper operation of said demodulator means requires that reference signals be applied to said demodulator means in appropriate timing synchronism with said chrominance signal and that said reference signals exhibit a frequency substantially equal to the frequency of said subcarrier component substantially exclusive of high frequency components including harmonics of said subcarrier frequency; apparatus comprising:

phase control means responsive to said chrominance signal and to a signal derived from said subcarrier component, for providing at an output a phase controlled reference signal at the frequency of said subcarrier component and having a phase modified toward the phase of said chrominance signal when the phase of said chrominance signal is within a range of phases corresponding to a nominal range of flesh tone phase, said reference signal undesirably comprising high frequency components including harmonic frequencies of said subcarrier frequency; and reference signal coupling path for supplying said reference signal to said reference signal input of said demodulator means via a reference signal coupling path, said filter means consisting of:

single-tuned, series resonant bandpass filter means coupled in series in said reference signal path, said bandpass filter means being tuned to attenuate said high frequency components including said harmonics in said reference signal input to said demodulator means.

2. Apparatus according to claim 1, wherein
said bandpass filter means comprises a reactive circuit consisting of a series coupled inductor and capacitor.

3. Apparatus according to claims 1 or 2, wherein
said bandpass filter means is tuned to exhibit a peak amplitude response at the frequency of said subcarrier component.

4. Apparatus according to claims 1 or 2, wherein
said bandpass filter means imparts a given phase shift to said reference signals such that filtered reference signals exhibit timing synchronism with said chrominance signals at said inputs of said demodulator means.

5. Apparatus according to claim 4, wherein
said bandpass filter means imparts a phase advance to reference signals filtered by said filter means.

6. In a system for processing a color television signal including a chrominance signal having a phase representative of image hue and a reference subcarrier component having a nominal phase relative to said chrominance signal, said system including first and second chrominance signal demodulators each with an input for receiving chrominance signals and a reference signal input, wherein proper operation of said demodulators requires that reference signals be applied to said demodulators in appropriate timing synchronism with said chrominance signals, that said reference signals exhibit a frequency substantially equal to the frequency of said subcarrier component substantially exclusive of high frequency components including harmonics of said subcarrier frequency, and that signals applied to said reference signal inputs exhibit a prescribed mutual phase difference; apparatus comprising:

phase control means responsive to said chrominance signal and to a signal derived from said subcarrier component, for providing at an output a phase controlled reference signal at the frequency of said subcarrier component and having a phase modified toward the phase of said chrominance signal when the phase of said chrominance signal is within a range of phases corresponding to a nominal range of flesh tone phase, said reference signal undesirably comprising high frequency components including harmonic frequencies of said subcarrier frequency;

filter means for supplying filtered reference signals to said reference signal inputs of said demodulators via a reference signal coupling path, said filter means having an input for receiving reference signals from said phase control means, and an output coupled to said reference signal input of said first demodulator;

phase shifting means with an input coupled to said output of said filter means and an output coupled to the reference signal input of said second demodulator, for phase shifting filtered signals coupled to said first demodulator relative to filtered signals applied to said second demodulator by an amount substantially corresponding to said prescribed phase difference; and wherein said reference signal coupling path consists of single-tuned, series resonant bandpass filter means coupled in series in said reference signal path, said bandpass filter means being tuned to attenuate said high frequency components including said harmonics in reference signals developed at said output of said filter means.

7. Apparatus according to claim 6, wherein
said bandpass filter means comprises a reactive circuit consisting of a series coupled inductor and capacitor.

8. Apparatus according to claims 6 or 7, wherein
said bandpass filter means is tuned to exhibit a peak amplitude response at the frequency of said subcarrier component.

9. Apparatus according to claims 6 or 7, wherein
said bandpass filter means imparts a given phase shift to said reference signals such that filtered reference signals exhibit said appropriate timing synchronism with said chrominance signals at said inputs of said demodulators.

10. Apparatus according to claim 9, wherein
said bandpass filter means imparts a phase advance to reference signals filtered by said filter means.

11. Apparatus according to claim 6, wherein
said phase shifting means corresponds to a quadrature phase shift network.

12. In a system for processing a color television signal including a chrominance signal having a phase representative of image hue and a reference subcarrier component having a nominal phase relative to said chrominance signal, said system including first and second chrominance signal demodulators each with an input for receiving chrominance signals and a reference signal input, wherein proper operation of said demodulators requires that reference signals be applied to said demodulators in appropriate timing synchronism with said chrominance signals, that said reference signals exhibit a frequency substantially equal to the frequency of said subcarrier component substantially exclusive of high frequency components including harmonics of said subcarrier frequency, and that signals applied to said reference signal inputs exhibit a prescribed mutual phase difference; apparatus comprising:

phase control means responsive to said chrominance signal and to a signal derived from said subcarrier component, for providing at an output a phase controlled reference signal at the frequency of said subcarrier component and having a phase modified toward the phase of said chrominance signal when the phase of said chrominance signal is within a range of phases corresponding to a nominal range of flesh tone phase, said reference signal comprising high frequency components including harmonic frequencies of said subcarrier frequency;

filter means for supplying filtered reference signals to said reference signal inputs of said demodulators via a reference signal coupling path, said filter means having an input for receiving reference signals from said phase control means, and an output;

first phase shifting means with an input coupled to said output of said filter means, and an output coupled to said reference signal input of said first demodulator;

second phase shifting means with an input coupled to said output of said first phase shifting means and an output coupled to said reference signal input of said second demodulator, for phase shifting signals received from said first phase shifting means by an amount substantially corresponding to said prescribed phase difference; and wherein said reference signal coupling path consists of single-tuned, series resonant bandpass filter means coupled in series in said reference signal path, said bandpass filter means being tuned to exhibit a peak amplitude response at said subcarrier frequency to attenuate said high frequency components including said harmonics in reference signals developed at said output of said filter means.

13. In a system for processing a color television signal including a chrominance signal having a phase representative of image hue and a reference subcarrier component having a nominal phase relative to said chrominance signal, said system including first and second chrominance signal demodulators each with an input for receiving chrominance signals and a reference signal input, wherein proper operation of said demodulators requires that reference signals be applied to said demodulators in appropriate timing synchronism with said chrominance signals, that said reference signals exhibit a frequency substantially equal to the frequency of said subcarrier component substantially exclusive of high frequency components including harmonics of said subcarrier frequency, and that signals applied to said reference signal inputs exhibit a prescribed mutual phase difference; apparatus comprising:

phase control means responsive to said chrominance signal and to a signal derived from said subcarrier component, for providing at an output a phase controlled reference signal at the frequency of said subcarrier component and having a phase modified toward the phase of said chrominance signal when the phase of said chrominance signal is within a range of phases corresponding to a nominal range of flesh tone phase, said reference signal comprising high frequency components including harmonic frequencies of said subcarrier frequency;

filter means for supplying filtered reference signals to said reference signal inputs of said demodulators via a reference signal coupling path, said filter means having an input for receiving reference signals from said phase control means, and an output;

first phase shifting means with an input coupled to said output of said filter means, and an output coupled to said reference signal input of said first demodulator; and second phase shifting means with an input coupled to said output of said first phase shifting means and an output coupled to said reference signal input of said second demodulator, for phase shifting signals received from said first phase shifting means by an amount substantially corresponding to said prescribed phase difference; wherein said reference signal coupling path consists of single-tuned, series resonant bandpass filter means coupled in series in said reference signal path, said bandpass filter means being tuned to exhibit a peak amplitude response at said subcarrier frequency to attenuate said high frequency components including said harmonics in reference signals developed at said output of said filter means;

a resistive impedance is coupled between said output of said filter means and a point of reference potential; and said second phase shifting means is tuned to exhbiit a peak amplitude response at said subcarrier frequency.

14. In a system for processing a color television signal including a chrominance signal having a phase representative of image hue and a reference subcarrier component having a nominal phase relative to said chrominance signal, said system including first and second chrominance signal demodulators each with an input for receiving chrominance signals and a reference signal input, wherein proper operation of said demodulators requires that reference signals be applied to said demodulators in appropriate timing synchronism with said chrominance signals, that said reference signals exhibit a frequency substantially equal to the frequency of said subcarrier component substantially exclusive of high frequency including harmonics of said subcarrier frequency, and that signals applied to said reference signal inputs exhibit a prescribed mutual phase difference; apparatus comprising:

phase control means responsive to said chrominance signal and to a signal derived from said subcarrier component, for providing at an output a phase controlled reference signal at the frequency of said subcarrier component and having a phase modified toward the phase of said chrominance signal when the phase of said chrominance signal is within a range of phases corresponding to a nominal range of flesh tone phase, said reference signal comprising high frequency components including harmonic frequencies of said subcarrier frequency;

filter means for supplying filtered reference signals to said reference signal inputs of said demodulators via a reference signal coupling path, said filter means having an input for receiving reference signals from said phase control means, and an output and said reference signal coupling path consisting of single-tuned, series resonant bandpass filter means coupled in series in said reference signal path, said bandpass filter means being tuned to exhibit a peak amplitude response at said subcarrier frequency to attenuate said high frequency components including said harmonics in reference signals developed at said output of said filter means;

first phase shifting means with an input coupled to said output of said filter means, and an output coupled to said reference signal input of said first demodulator; and second phase shifting means with an input coupled to said output of said first phase shifting means and an output coupled to said reference signal input of said second demodulator, for phase shifting signals received from said first phase shifting means by an amount substantially corresponding to said prescribed phase difference; wherein said bandpass filter means comprises a reactive circuit consisting of a series coupled inductor and capacitor;

a resistor is coupled between the output of said bandpass filter means and a point of reference potential;

said first phase shifting means comprises a capacitance for phase shifting filtered reference signals from said bandpass filter means so that filtered reference signals exhibit appropriate timing synchronism with said chrominance signals at said demodulator inputs; and said second phase shifting means corresponds to a quadrature phase shift network tuned to exhibit a peak amplitude response at said subcarrier frequency.

15. Apparatus according to claim 14, wherein said capacitance imparts a phase advance to filtered reference signals applied to said second phase shifting means.

* * * * *

UNITED STATES PATENT AND TRADEMARK OFFICE
CERTIFICATE OF CORRECTION

PATENT NO. : 4,385,311

DATED : May 24, 1983

INVENTOR(S) : Leopold A. Harwood, et al.

It is certified that error appears in the above-identified patent and that said Letters Patent is hereby corrected as shown below:

Col. 7, line 19, "reference signal coupling path" should be -- filter means --;

Col. 7, line 22 "filter means" should be -- reference signal coupling path --.

Signed and Sealed this

Sixteenth Day of August 1983

[SEAL]

Attest:

GERALD J. MOSSINGHOFF

Attesting Officer     Commissioner of Patents and Trademarks